Dec. 27, 1949      H. T. KELSH      2,492,870
STEREOSCOPIC PROJECTION MAP-MAKING INSTRUMENT
Filed Jan. 20, 1948      5 Sheets-Sheet 1

Inventor
HARRY T. KELSH

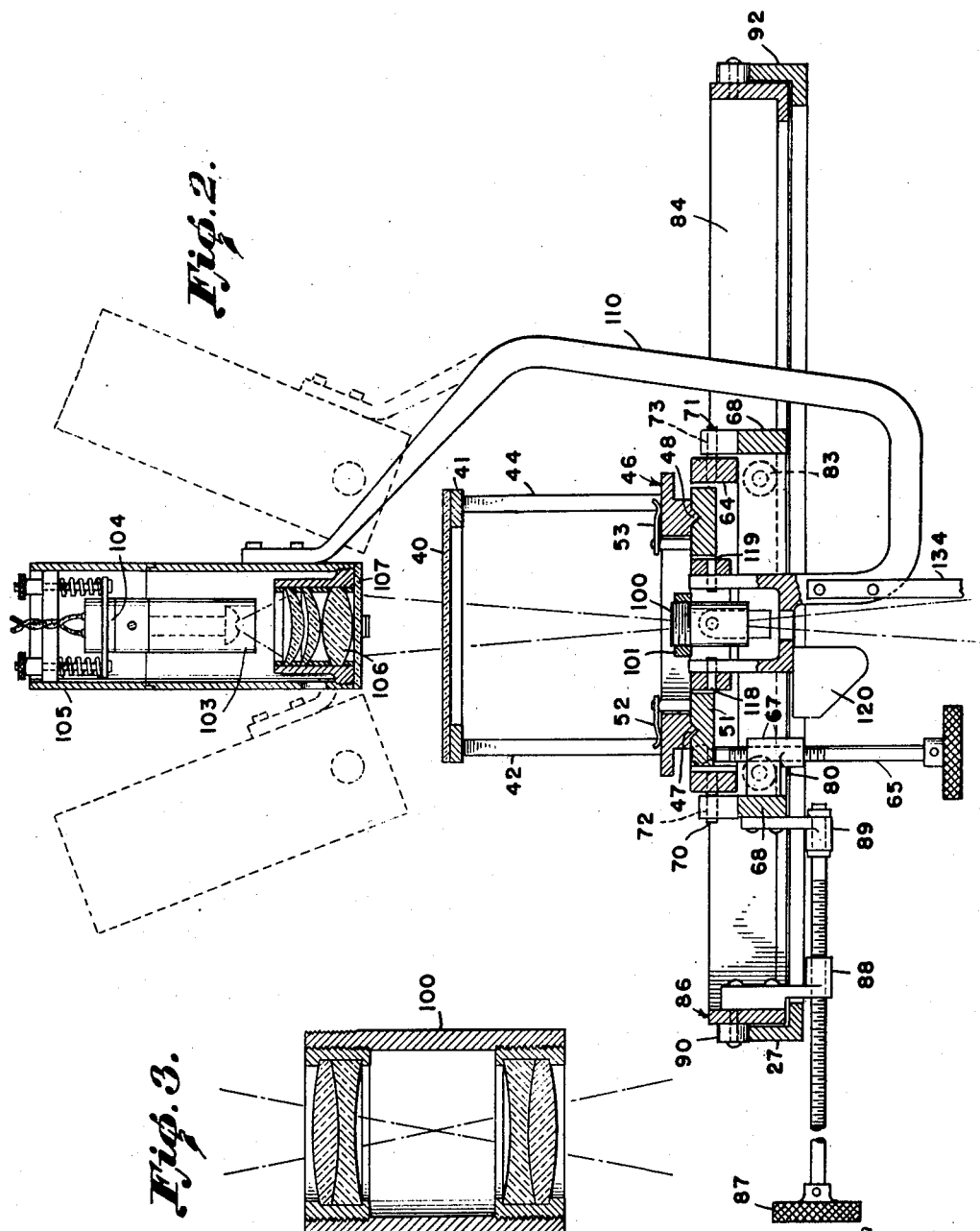

Dec. 27, 1949    H. T. KELSH    2,492,870
STEREOSCOPIC PROJECTION MAP-MAKING INSTRUMENT
Filed Jan. 20, 1948    5 Sheets-Sheet 3
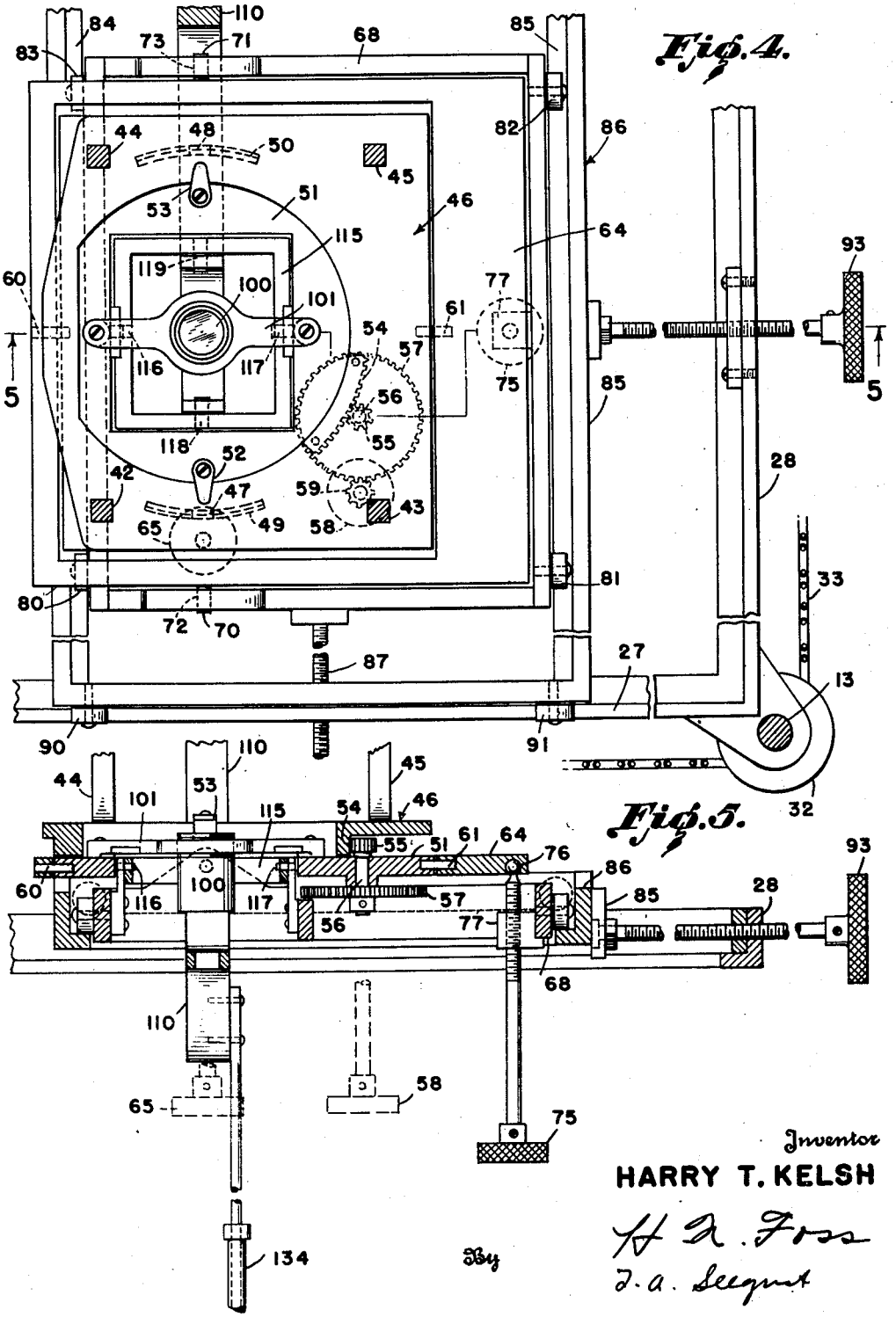
Inventor
HARRY T. KELSH Dec. 27, 1949 H. T. KELSH 2,492,870
STEREOSCOPIC PROJECTION MAP-MAKING INSTRUMENT
Filed Jan. 20, 1948 5 Sheets-Sheet 4
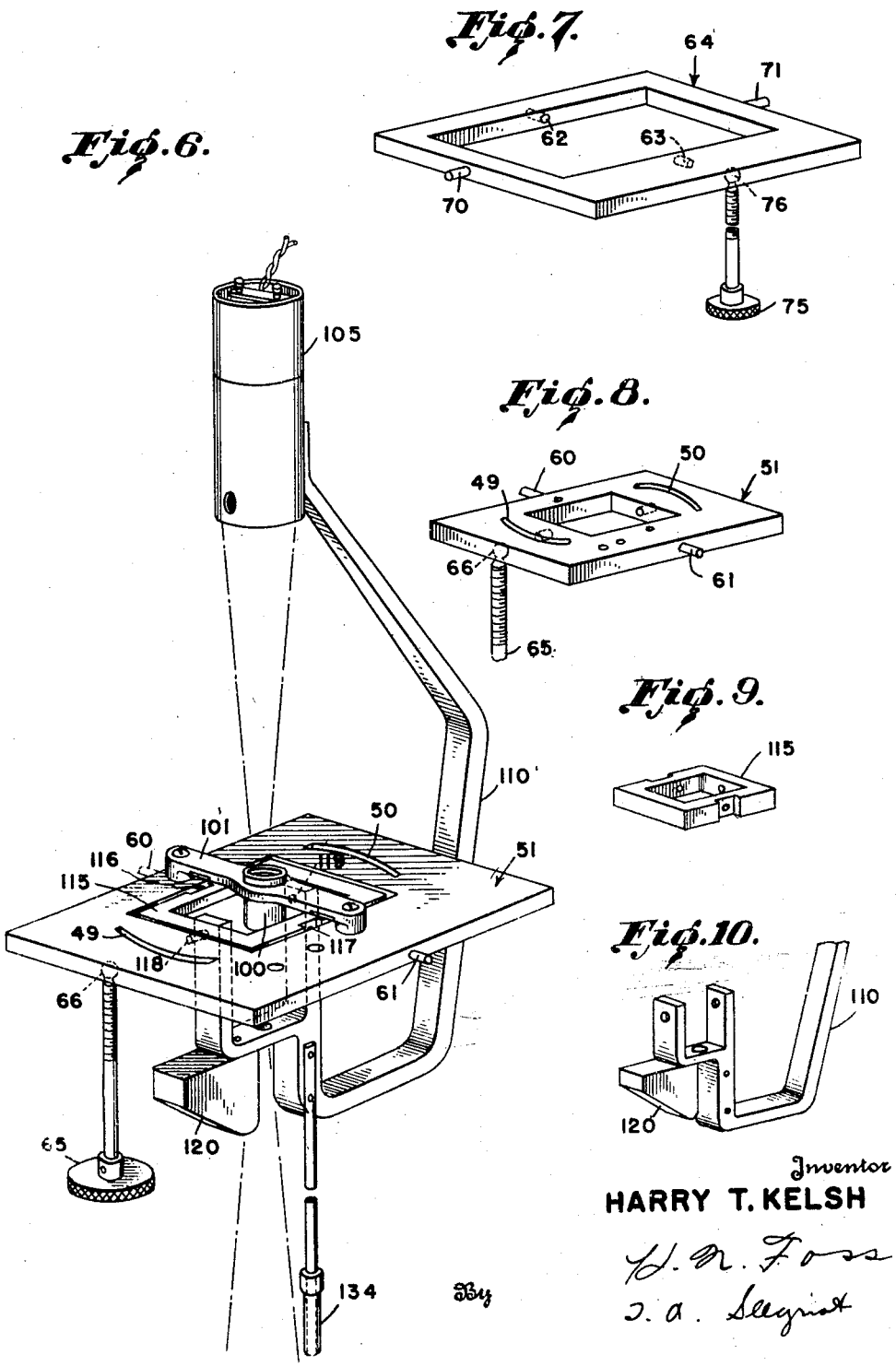
Inventor
HARRY T. KELSH Dec. 27, 1949     H. T. KELSH     2,492,870
STEREOSCOPIC PROJECTION MAP-MAKING INSTRUMENT
Filed Jan. 20, 1948     5 Sheets-Sheet 5
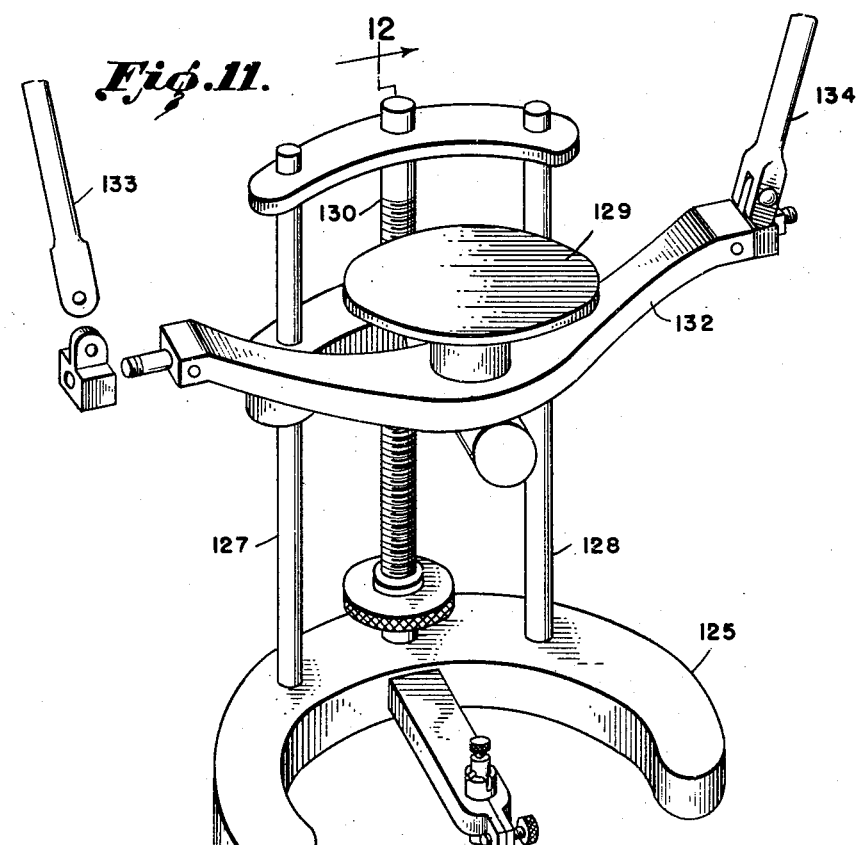
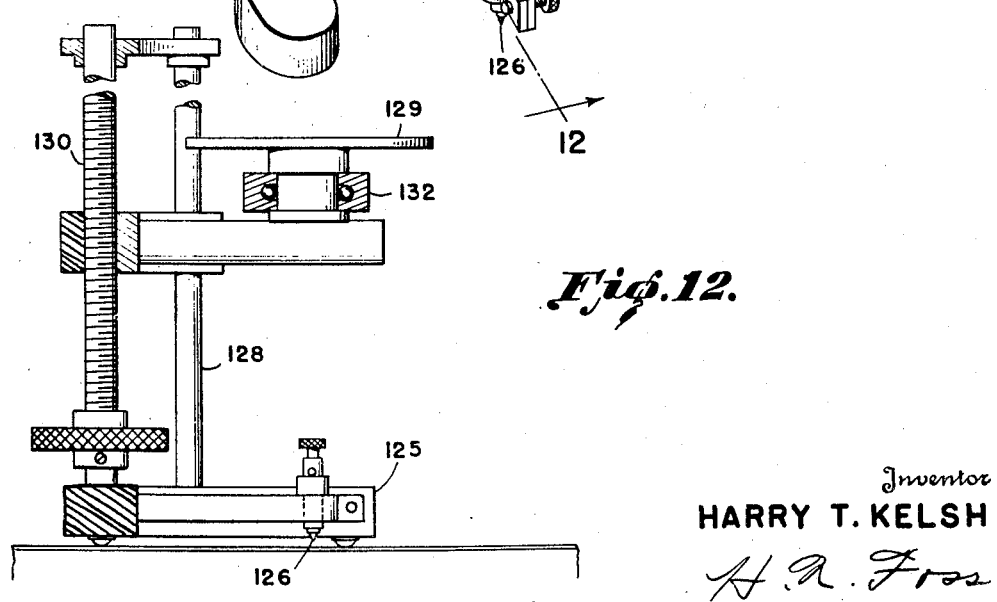
Inventor
HARRY T. KELSH Patented Dec. 27, 1949

2,492,870

UNITED STATES PATENT OFFICE 2,492,870

STEREOSCOPIC PROJECTION MAP-MAKING INSTRUMENT

Harry T. Kelsh, Washington, D. C.

Application January 20, 1948, Serial No. 3,263

4 Claims. (Cl. 88—24)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to photogrammetry and is an improvement over the instrument for making maps by stereophotogrammetric methods disclosed in my copending application, Serial No. 669,772, filed May 15, 1946, now Patent No. 2,451,031, dated October 12, 1948.

According to the invention of my copending application, a pair of overlapped standard size (9" by 9") slides (negatives taken by aeroplane, or transparencies made from them) are projected onto drawing paper arranged on a drawing board either for visual inspection or for map-making purposes, a standard plotting table being used for drawing the map. In general, according to that invention, the instrument is provided with a frame having two projection lanterns each having a lens and slide receiving means and supported side by side on the frame for projecting images of a pair of consecutive slides on a screen. Light filtering devices such as complementary color filters or polarizers are so arranged that the superimposed images may be viewed through glasses colored to match the color filters or through polarizer glasses to show a stereoscopic model, so that the drawing paper may be placed on the map table as a screen and the model cast on the drawing paper, or cast on the screen of a standard movable plotting table and topographic and planimetric maps drawn in the regular manner. The parts are so constructed and arranged, especially as to adjustment, that a model of degree of fineness required for work of this kind is obtained.

In that instrument, the light for each lantern is provided by a point light source and light condenser so arranged that the light converges through substantially the entire area of the slide, thence through the nodal point of the lens and diverges to cover substantially the entire area of the map drawing paper. This requires a light of considerable candle power, and due to the large divergence of the light, the light intensity on the drawing paper varies materially, being less intense at the edges.

It is the object of the present invention to provide an instrument employing a lesser candle power lighting system and yet maintain ample illumination for map-making purpose, and giving greater uniformity of light intensity over the area necessary to be viewed.

In drawing maps with a plotting table, the only area which need be viewed at any particular time is the small area of the plotting table screen on which the stereoscopic model is viewed. In general, according to the present invention, a small point light source and a light condenser are provided for each lantern, the light source and light condenser being so arranged as to converge the light through only a small area of the slide and thence through the nodal point of the lens, and diverge the light onto a small area sufficient substantially to cover the screen of the plotting table. The light source and light condenser are movable, however, in such manner that substantially the entire area of the slide may be traversed by the converging light rays. The means for moving each light source is attached to the plotting table so that as the plotting table is moved about on the drawing paper, the light source and condenser move in a manner to maintain the image on the screen of the plotting table and to maintain the point of convergence of the light rays coincident with the nodal point of the lens.

For a detail description of the invention, reference is made to the accompanying drawing, in which:

Figure 2 is a section on line 2—2 of Figure 1;

Figure 3 is an enlarged longitudinal section of the lens;

Figure 4 is a section on line 4—4 of Figure 1;

Figure 5 is a section on line 5—5 of Figure 4;

Figure 6 is a three-dimensional view showing a portion of the instrument to illustrate the manner of mounting the light;

Figures 7, 8, 9 and 10 are three-dimensional views of details used with the assembly shown in Figure 6;

Figure 11 is a three-dimensional view of the plotting table with parts broken away to illustrate the manner of connecting the means for moving the light to the plotting table; and Figure 12 is a section on the line 12—12 of Figure 11.

Figure 1:
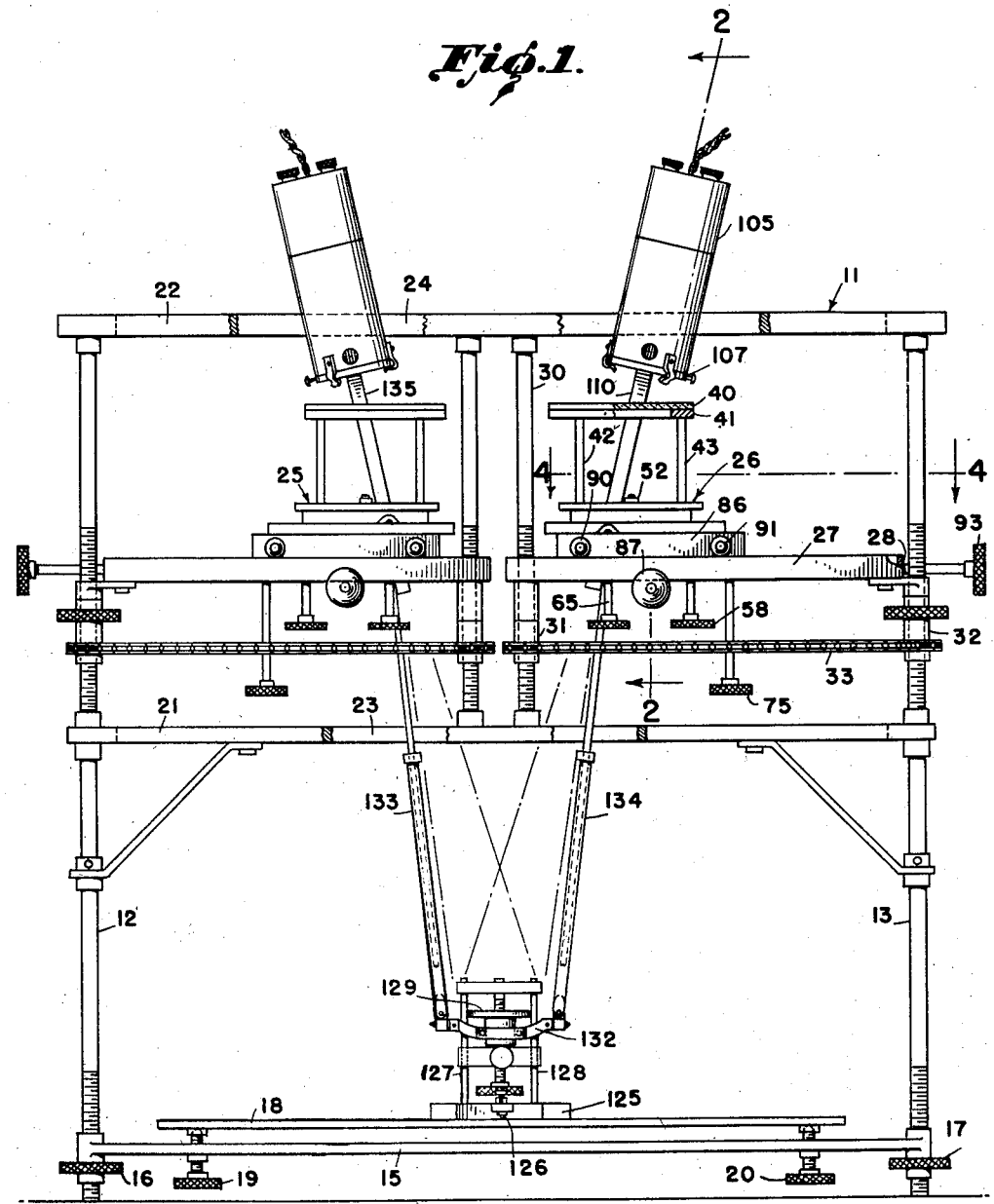
Figure 1 is a front elevation of the instrument with parts broken away for clarity in illustration.

In the drawing, the main frame 11 of the instrument is provided with an upright at each corner, the front two of which are shown at 12 and 13 of Figure 1. A horizontal platform 15 is vertically slidably mounted on the uprights and adjusted by knurled adjusting nuts 16 and 17 threaded on the uprights, a drawing board 18 being adjustably mounted on the platform by adjusting screws as shown at 19 and 20. A central open, rectangular cross frame, the front side member of which is shown at 21, and an upper open, rectangular cross frame, the front side member of which is shown at 22, the back side members being shown at 23 and 24, respectively, are rigidly fixed to the uprights.

A pair of projection lanterns 25 and 26 are suitably adjustably supported on the frame to cast superimposed images from a pair of consecutive slides onto the screen of the plotting table. These lanterns are similar, except that one is arranged at the left hand and the outer at the right hand, the position of the parts corresponding, and the color filter in one is complementary to that of the other, or in case of the use of polarizers, one polarizer is normal to the other, and only lantern 26 and its supports and adjustments will be described in detail.

Lantern 26 is supported on an open, rectangular lantern supporting frame, the front and right-hand side members being shown at 27 and 28, respectively, the lantern frame being horizontally slidably mounted on the uprights at the right side of the main frame and at the left side of the lantern on uprights secured between the central and upper open, rectangular cross frames, the front one of said last-mentioned uprights being shown at 30. Vertical adjustment of the lantern is obtained by sprocketed nuts, the front two being shown at 31 and 32, threaded on the uprights, these nuts being simultaneously operated by a continuous loop chain 33 engaging the nut sprockets.

The slide 40 is removably supported on an open, rectangular slide supporting frame 41 which in turn is carried by legs 42, 43, 44 and 45 at its corner, these legs being rigidly attached to an apertured bottom 46. Bottom 46 is provided with downwardly extending tits 47 and 48 which are slidable in mating grooves 49 and 50 arranged on a circle in an open bottom supporting member 51, thus to provide for partial rotation of bottom 46 and slide 40 to compensate for crab of the aeroplane in taking the snapshot. The bottom 46 is held in place by spring clips 52 and 53 and is rotated by a sector 54 of gear teeth driven by a gear 55 attached to one end of a drive shaft 56 rotatably mounted in supporting member 51. The other end of the drive shaft is provided with a gear 57 fixed thereto which may be manually rotated by means of a thumb screw 58, the shaft of which is also rotatably mounted in the member 51, driving a gear 59 mating with gear 57, thus to angularly adjust the slide.

Member 51 is provided with laterally projecting pivot pins 60 and 61 which engage in suitable sockets 62 and 63 provided in opposite sides of an open, rectangular frame member 64. This provides for tilting the lantern to compensate for tilt of the aeroplane in taking the snapshots. Member 51 is tilted by means of a manually operated thumb screw 65 having a spherical tip 66 engaged in a mating socket in member 64 and threaded through a lug 67 fixed to an open rectangular frame member 68.

Member 64 in turn is provided with pivot pins 70 and 71 projecting normal to pivot pins 60 and 61 and engaging in suitable sockets 72 and 73 provided in opposite sides of the frame member 68, the member 64 being caused to pivot by operation of a manually operated thumb screw 75 having a spherical tip 76 engaging in a mating socket in member 64, thumb screw 75 being threaded through a lug 77 fixed to member 68. This adjustment compensates for tip of the aeroplane in taking the snapshots.

Frame member 68 is mounted on rollers 80, 81, 82 and 83 which ride on side members 84 and 85 of an open, rectangular frame member 86 thus to provide for lateral adjustment of the lantern relative to the other lantern, member 68 being moved in making this adjustment by means of a normally operated thumb screw 87 threaded through lug 88 fixed to member 86 and having its tip pivoted on a lug 89 fixed to member 68.

Frame member 86 is mounted on rollers, the front two of which are shown at 90 and 91, which ride on the front and back members 27 and 92 of the lantern supporting frame thus to provide adjustment of the lantern toward or away from the other lantern. Member 86 is moved by thumb screw 93 threaded in side member 28 and having its tip rotatably mounted in side member 85 of frame member 86.

The general arrangement of parts and adjustments thus far described is generally similar to that described in my copending application above referred to. The particular features of novelty in the present invention over the copending application relate to the lens, the light and light condenser, the plotting table, and the manner in which these parts are related to each other.

The lens 100 itself, shown in detail in Figure 3, is of a usual construction. This lens is fixedly mounted in a bracket 101 which in turn is fixed to the bottom supporting member 51, as best shown in Figure 6. Thus it will be noted that the lens partakes of all the adjustments above described, except that to compensate for crab of the aeroplane.

The light bulb 103 is a small size commercial type bulb, designed to give substantially a point light source, mounted in a socket 104 suitably supported in a casing 105, a small light condenser 106 being provided to converge the light rays through a polarizer 107 and to a point. The casing 105 is fixed to one end of a light-supporting bracket 110 which is universally mounted relative to the lens at its other end to member 51 in such manner that the light in converging passes through a small area of the slide 40 and its point of convergence coincides with the nodal point of the lens, regardless of any adjustments of the instrument or movement of the light. Furthermore, angular adjustment of the lanterns to compensate for crab does not disturb the lens and the light or its mounting parts. Consequently, polarizers may be used as at 107 and when properly adjusted normal to each other, adjustment for crab does not affect them.

For the purpose of this universal mounting, a small open, rectangular frame member 115 is pivoted on pins 116 and 117 inside the opening through member 51 for swinging on a pivot line containing the nodal point of the lens, and bracket 110 is pivoted on pins 118 and 119 for swinging on a pivoted line normal to the pivoted line of pins 116 and 117 and also containing the nodal point of the lens.

The bracket 110 being offset in the manner illustrated is provided with a counterweight 120 to obtain balance.

A usual type plotting table best shown in Figures 11 and 12, as provided with the usual base 125 carrying a stylus 126, with upright standards 127 and 128 slidably mounting the plotting table screen 129, and with an adjusting screw 130 for vertical adjustment of the screen. Means for moving the lights is so attached to the plotting table that as the table is moved about the image cast upon the screen from each light remains on the screen. This is accomplished by provision of a cross bar 132 rotatably mounted on the plotting table and telescoping rods 133 and 134 universally attached at their lower end to ends of bar 132 and fixedly attached at their upper ends to the light supporting bracket 135 and 110 of the lantern 25 and 26, respectively, the arrangement being such that the line through the point light source and the nodal point of the lens of each lantern falls approximately on the center of the plotting table screen.

It will thus be seen that, with a pair of consecutive slides properly positioned in the lanterns and proper adjustments of the lantern to give a clear stereoscopic model on the plotting table screen when viewed through color filters such as polarizer glasses, the plotting table may be moved about at will and the lights will so move that the image from different small areas of the slides will always be cast on the screen, thus accomplishing the purposes of this invention.

Having thus described the invention, what is claimed is:

1. An instrument for making maps by stereophotogrammetric methods, comprising a pair of projection lanterns each having a lens and slide-receiving means and supported side by side for projecting superimposed images of a pair of consecutive slides, a movable plotting table having a screen on which the images are projected for viewing to give a stereoscopic model, a point light source for each lantern and a light condenser to converge the light rays through a small area of the slide and to a point coincident with the nodal point of the lens and diverge the light rays to cover approximately the screen of the plotting table, each of said light source and light condenser being movably mounted relative to the lens in such manner that substantially the entire area of the slide in each lantern may be traversed by the converging light rays, and means for moving each light source and its light condenser so attached to the plotting table that, as the plotting table is moved about, the light source and condenser move in a manner to maintain the image on the screen and to maintain the point of convergence of the light rays coincident with the nodal point of the lens.

2. A stereoscopic projection apparatus comprising a pair of projection units having each a diapositive mount, a movable light beam projector and a projection lens, a movable mapping table having a projection screen, a linkage system connecting said table to said projectors so as to constrain the movements of the projectors in response to movements of the table so that the projectors will each swing in an arc about the nodal region of its projection lens and light from the projectors will pass through said nodal regions onto said screen, and means, including said projection lenses, for limiting the spread of light from said projectors to substantially the area of said screen.

3. A stereoscopic projection apparatus comprising a pair of projection units having each a diapositive mount, a movable light beam projector and a projection lens, a movable mapping table having a projection screen, a linkage system connecting said table to said projectors so as to constrain the movements of the projectors in response to movements of the table so that the projectors will each swing in an arc about its corresponding projection lens at a predetermined radius from the nodal region of the lens and light from the projectors will pass through said nodal regions onto said screen, and means, including said projection lenses, for limiting the spread of light from said projectors to substantially the area of said screen.

4. A stereoscopic projection apparatus comprising a pair of projection units having each a diapositive mount, a movable light beam projector and a projection lens, a movable mapping table having a projection screen, a linkage system connecting said table to said projectors so as to constrain the movements of the projectors in response to movements of the table so that the projectors will each swing in an arc about its corresponding projection lens at a predetermined radius from the nodal region of the lens and light from the projectors will pass through said nodal regions onto said screen, means for adjusting the length of the said radius, and means, including said projection lenses for limiting the spread of light from said projectors to substantially the area of said screen.

HARRY T. KELSH.

REFERENCES CITED

The following references are of record in the file of this patent:

UNITED STATES PATENTS

| Number | Name | Date |
|---|---|---|
| 1,199,460 | Featherstone | Sept. 26, 1916 |
| 1,655,306 | Barr et al. | Jan. 3, 1928 |
| 1,980,657 | Bauersfeld | Nov. 13, 1934 |
| 1,980,981 | Cooke | Nov. 20, 1934 |
| 2,022,366 | Boecking | Nov. 26, 1935 |
| 2,023,970 | Newman | Dec. 10, 1935 |
| 2,085,498 | Horner | June 29, 1937 |
| 2,164,847 | Trautmann | July 4, 1939 |
| 2,187,803 | Griffin | Jan. 23, 1940 |